(12) United States Patent
Kindl et al.

(10) Patent No.: US 11,333,109 B2
(45) Date of Patent: May 17, 2022

(54) METHODS AND SYSTEMS FOR A TURBOCHARGED ENGINE

(71) Applicant: Ford Global Technologies, LLC, Dearborn, MI (US)

(72) Inventors: Helmut Matthias Kindl, Aachen (DE); Vanco Smiljanovski, Bedburg (DE); Joerg Kemmerling, Monschau (DE); Andreas Kuske, Geulle (NL); Hanno Friederichs, Aachen (DE); Guenter Hans Grosch, Vettweiß (DE); Michael Forsting, Moenchengladbach (DE); Frank Wunderlich, Herzogenrath (DE); Hans Guenter Quix, Herzogenrath (DE); Franz Arnd Sommerhoff, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 16/858,153

(22) Filed: Apr. 24, 2020

(65) Prior Publication Data

US 2020/0340431 A1    Oct. 29, 2020

(51) Int. Cl.
| | | |
|---|---|---|
| F02M 31/13 | (2006.01) |
| F02M 35/10 | (2006.01) |
| F02M 26/22 | (2016.01) |
| F02M 26/02 | (2016.01) |
| F02M 35/04 | (2006.01) |

(52) U.S. Cl.
CPC ............ *F02M 31/13* (2013.01); *F02M 26/02* (2016.02); *F02M 26/22* (2016.02); *F02M 35/044* (2013.01); *F02M 35/10163* (2013.01); *F02M 35/10222* (2013.01)

(58) Field of Classification Search
CPC ........ F02M 31/13; F02M 26/02; F02M 26/22; F02M 35/044; F02M 35/10163; F02M 35/10222; Y02T 10/12
See application file for complete search history.

(56) References Cited

U.S. PATENT DOCUMENTS 8,297,922 B2    10/2012    Cruickshank

FOREIGN PATENT DOCUMENTS

| DE | 102008004446 A1 | 8/2008 | |
| DE | 102013003457 A1 | 9/2014 | |
| DE | 102017201922 A1 | 8/2018 | |
| FR | 2797660 A1 * | 2/2001 | ............ F02M 31/10 |
| KR | 20070044870 A | 5/2007 | |

\* cited by examiner

*Primary Examiner* — Jacob M Amick
*Assistant Examiner* — Charles J Brauch
(74) *Attorney, Agent, or Firm* — Geoffrey Brumbaugh McCoy Russell LLP

(57) ABSTRACT

Methods and systems are provided for a heating device. In one example, a system comprises a heat exchanger and an air filter arranged in a common housing, wherein the heat exchanger is configured to receive coolant from a heating device. In one example, the heating device is an electric heating device.

20 Claims, 4 Drawing Sheets

METHODS AND SYSTEMS FOR A TURBOCHARGED ENGINE

CROSS REFERENCE TO RELATED APPLICATIONS

The present application claims priority to German Application No. 102019206104.4 entitled "METHODS AND SYSTEMS FOR A TURBOCHARGED ENGINE" filed on Apr. 29, 2019, and to German Application No. 102019206216.4 entitled "METHODS AND SYSTEMS FOR A TURBOCHARGED ENGINE" filed on Apr. 30, 2019. The entire contents of the above-listed application are hereby incorporated by reference for all purposes.

FIELD

The present description relates generally to an electric heating device configured to heat coolant for a heat exchanger for heating charge air.

BACKGROUND/SUMMARY

Internal combustion engines may get hot and therefore also place increased demands on the cooling arrangement. This may be exacerbated if the cylinder head is equipped with an integrated exhaust manifold and/or the internal combustion engine is a supercharged internal combustion engine.

If the internal combustion engine has a liquid cooling arrangement, a plurality of coolant ducts, or at least one coolant jacket is generally formed in the cylinder head and/or cylinder block, which coolant ducts or coolant jacket conduct(s) the coolant through the cylinder head or the cylinder block.

In the development of internal combustion engines, it is constantly sought to minimize fuel consumption. Furthermore, a reduction of the pollutant emissions is desired to be able to comply with future limit values for pollutant emissions.

Internal combustion engines may be equipped with a supercharging arrangement, wherein supercharging is primarily a method for increasing power, in which the charge air used for the combustion process in the engine is compressed, as a result of which a greater mass of charge air can be supplied to each cylinder per working cycle. In this way, the fuel mass and therefore the mean pressure can be increased.

Supercharging is a suitable element for increasing the power of an internal combustion engine while maintaining an unchanged swept volume, or for reducing the swept volume while maintaining the same power. In all cases, supercharging leads to an increase in volumetric power output and a more expedient power-to-weight ratio. If the swept volume is reduced, it is thus possible to shift the load collective toward higher loads, at which the specific fuel consumption is lower. By means of supercharging in combination with a suitable transmission configuration, it is also possible to realize so-called downspeeding, with which it is likewise possible to achieve a lower specific fuel consumption.

Supercharging consequently assists in the constant efforts in the development of internal combustion engines to minimize fuel consumption, that is to say to improve the efficiency of the internal combustion engine.

For supercharging, use is often made of an exhaust-gas turbocharger, in which a compressor and a turbine are arranged on the same shaft. The hot exhaust-gas flow is fed to the turbine and expands in the turbine with a release of energy, as a result of which the shaft is set in rotation. The energy released by the exhaust-gas flow to the turbine and ultimately to the shaft is used for driving the compressor, which is likewise arranged on the shaft. The compressor conveys and compresses the charge air fed to it, as a result of which supercharging of the cylinders is obtained.

A charge-air cooler is advantageously provided in the intake system downstream of the compressor, wherein the charge-air cooler cool the compressed charge air before it enters the at least one cylinder. The cooler lowers the temperature and thereby increases the density of the charge air, such that the cooler also contributes to improved charging of the cylinders, that is to say to a greater air mass. Compression by cooling takes place.

The advantage of an exhaust-gas turbocharger in relation to a mechanical supercharger consists in that an exhaust-gas turbocharger utilizes the exhaust-gas energy of the hot exhaust gases, whereas a mechanical supercharger draws the energy desired for driving it directly or indirectly from the internal combustion engine and thus adversely affects, that is to say reduces, the efficiency, at least for as long as the drive energy does not originate from an energy recovery source. In general, a mechanical connection, such as for example a traction mechanism drive, is used for the transmission of power between the supercharger and the internal combustion engine.

The advantage of a mechanical supercharger in relation to an exhaust-gas turbocharger consists in that, in general, the mechanical supercharger can generate and provide the demanded charge pressure independently of the present operating state of the internal combustion engine, in particular also at low rotational speeds of the crankshaft. The advantage of a supercharger in relation to an exhaust-gas turbocharger consists in that the supercharger can generate, and make available, the desired charge pressure at a larger range of conditions, specifically regardless of the operating state of the internal combustion engine. This applies in particular to a supercharger which can be driven electrically via an electric machine, and is therefore independent of the rotational speed of the crankshaft.

In the previous examples, it is specifically the case that difficulties are encountered in achieving an increase in power in all engine speed ranges via exhaust-gas turbocharging. A relatively severe torque drop is observed in the event of a certain engine speed being undershot. Said torque drop is understandable if one takes into consideration that the charge pressure ratio is dependent on the turbine pressure ratio. If the engine speed is reduced, this leads to a smaller exhaust-gas mass flow and therefore to a lower turbine pressure ratio, as a result of which the charge pressure ratio likewise decreases toward lower engine speeds. This equates to a torque drop. The supercharged internal combustion engine to which the present disclosure relates has, for supercharging purposes, at least one compressor, which may be a mechanical supercharger, an electric supercharger or the compressor of an exhaust-gas turbocharger.

Problems may arise upstream of the compressor in particular if the internal combustion engine is equipped with an exhaust-gas recirculation arrangement in which the exhaust gas is introduced into the intake system upstream of the compressor. Specifically, condensate may form.

Firstly, condensate can form if recirculated hot exhaust gas meets, and is mixed with, cool fresh air. The exhaust gas cools down, whereas the temperature of the fresh air is increased. The temperature of the mixture of fresh air and recirculated exhaust gas, that is to say the charge-air temperature, lies below the exhaust-gas temperature of the recirculated exhaust gas. During the course of the cooling of the exhaust gas, liquids previously contained in the exhaust gas still in gaseous form, in particular water, may condense if the dew point temperature of a component of the gaseous charge-air flow is undershot.

Condensate forms in the free charge-air flow, wherein impurities in the charge air often form the starting point for forming condensate droplets.

Secondly, condensate can form when recirculated hot exhaust gas and/or the charge air impinges on the internal wall of the intake system or on the internal wall of the compressor housing, since the wall temperature generally lies below the dew point of the relevant gaseous components.

The problem described above is intensified with increasing recirculation rate, because, with the increase of the recirculated exhaust-gas flow rate, the fractions of the individual exhaust-gas components in the charge air, in particular the fraction of the water contained in the exhaust gas, may increase. In previous examples, therefore, the exhaust-gas flow rate recirculated via the low-pres sure EGR arrangement is commonly limited in order to block or reduce the occurrence of condensation. The desired limitation of the low-pressure EGR on the one hand and the high exhaust-gas recirculation rates desired for a considerable reduction in the nitrogen oxide emissions on the other hand lead to different aims in the dimensioning of the recirculated exhaust-gas flow rate. The legal demands for the reduction of the nitrogen oxide emissions highlight the high relevance of this problem in practice.

Furthermore, the problem of condensate formation gains relevance as the ambient temperature decreases. The lower the ambient temperature, the higher is the probability of condensate formation and more condensate is thus formed. This is significant in real conditions particularly in view of the test cycles proposed by legislature.

The effects described above in conjunction with the recirculation of hot exhaust gas apply analogously also to the ventilation flow, which is commonly extracted from the crankcase and introduced into the intake system upstream of the compressor.

Condensate and condensate droplets are undesirable and lead to an increased noise emission in the intake system, possibly to damage to the blades of the at least one compressor impeller. This is associated with a reduction in the efficiency of the compressor.

U.S. Pat. No. 8,297,922 B1 describes a cowl which is intended to protect the impeller of the compressor against degradation and deposits. The cowl constitutes an additional weight which rotates with the rotating impeller of the compressor, wherein correspondingly high forces act on the compressor shaft and in the bearing. Since the heavy cowl and furthermore also the rotating impeller of the compressor may be accelerated and decelerated, the response behavior of the compressor is not inconsiderably impaired.

The impeller of the compressor can also be coated or surface-treated, in particular hardened.

Alternatively, the compressor according to previous example is equipped with a heating device via which the temperature of the internal wall of the compressor housing can be increased. Formation of condensate on the internal wall of the intake system or on the internal wall of the compressor housing can be blocked or reduced in this way. This is a cumbersome and expensive concept.

Another concept from the prior art makes provision to arrange a heat exchanger in the intake system upstream of the compressor. The heat exchanger is incorporated into the coolant circuit of the internal combustion engine, and therefore heat can be admitted into the cooler charge air by means of heated coolant. A disadvantage of this concept is that heating of the charge air by means of coolant is not possible following a cold start of the internal combustion engine since, following a cold start, the coolant itself generally does not have the higher temperature required for heating the charge air, in particular not when ambient temperatures are low.

Against this background, it is an object of the present disclosure to provide a supercharged internal combustion engine which overcomes the disadvantages associated with the previous examples are overcome and via which condensate formation in the intake system can be counteracted.

In one example, the issues described above may be at least partially avoided via a supercharged internal combustion engine having a liquid cooling arrangement comprising a coolant circuit conducting a coolant, an intake system for the supply of charge air, an exhaust-gas discharge system for the discharge of exhaust gas, at least one compressor which is arranged for the purposes of compressing the charge air in the intake system and comprises at least one impeller which is mounted on a rotatable shaft in a compressor housing and is equipped with impeller blades, an exhaust-gas recirculation arrangement comprising a recirculation line which opens into the intake system upstream of the at least one compressor impeller with the formation of a first junction point, and a heat exchanger which is arranged upstream of the first junction point in the intake system and is incorporated into the coolant circuit and serves for transferring heat between the charge air and the coolant, wherein the internal combustion engine comprises an electrically operated heating device is arranged in the coolant circuit upstream of the heat exchanger.

According to the disclosure, the liquid cooling arrangement of the internal combustion engine is equipped with an electrically operated heating device which is arranged in the coolant circuit upstream of the heat exchanger and with which, when the demand arises, the temperature of the coolant can be increased before it enters the heat exchanger; for example, during cold starting of the internal combustion engine or at a low ambient temperature. The heating device can be used to raise the coolant temperature beyond the charge-air temperature, i.e. the temperature of the ambient air, and therefore, using the heated coolant, heat can be admitted into the charge air as the latter flows through the heat exchanger.

Formation of condensate on the internal wall of the intake system or of the compressor housing and formation of condensate in the free charge-air flow can be blocked or reduced in this way.

By mitigating the formation of condensate in the intake system and in the inlet region of the compressor, a noise emission due to condensate droplets may also be reduced. The likelihood of degradation to the impeller blades of the at least one compressor is reduced.

Within the concept of the present disclosure, lower ambient temperatures relate in particular to temperatures below the freezing point, for example minus 7° C.

An electric heating device can be activated and used at any time for heating the coolant by supplying heat. This electric heating device may be supplied with power for example via the on-board battery of a vehicle, irrespective of the operating state of the internal combustion engine.

Embodiments of the supercharged internal combustion engine may comprise where the recirculation line branches off from the exhaust-gas discharge system, so as to form a second junction point.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
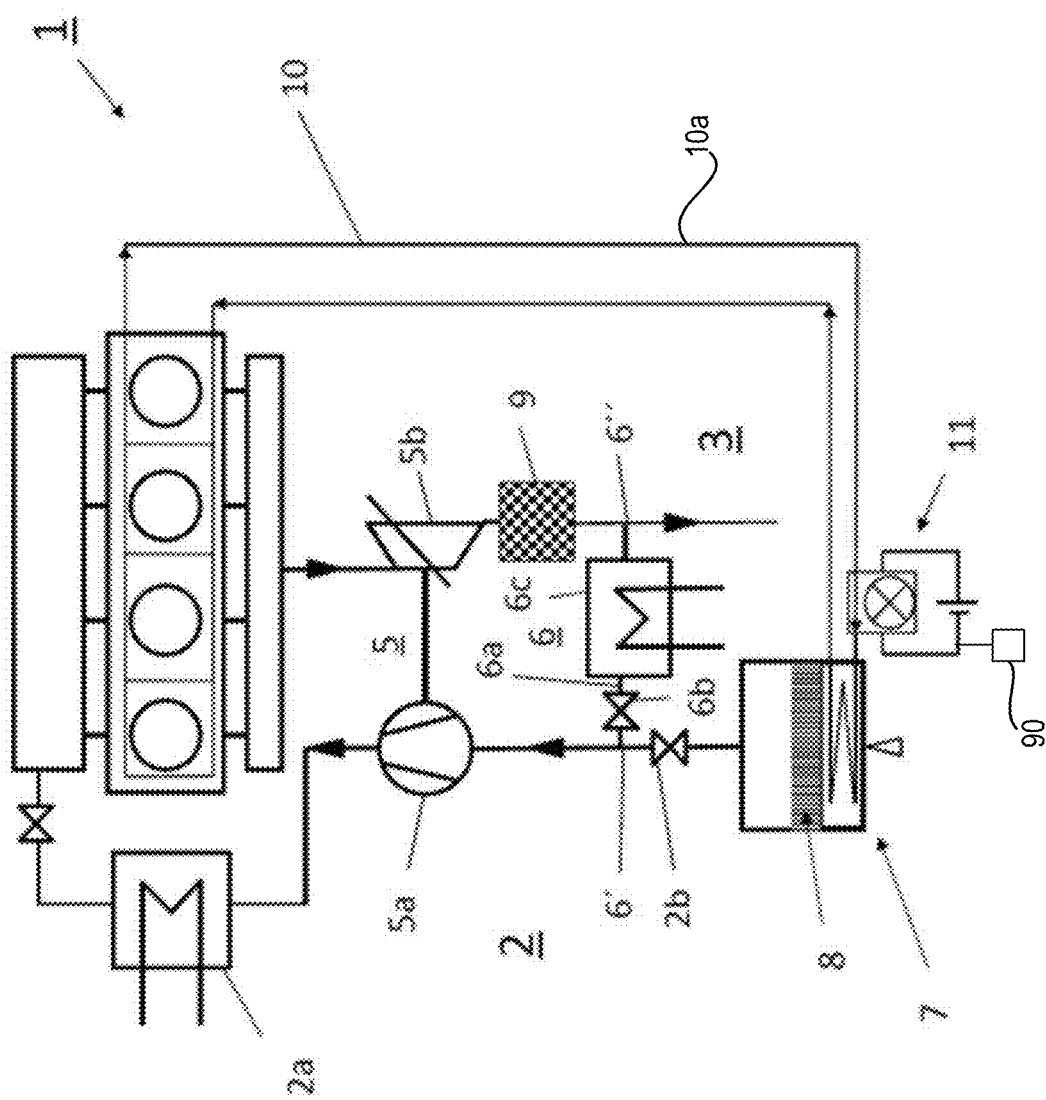
FIG. 1 schematically shows an embodiment of the internal combustion engine.
Figure 1:
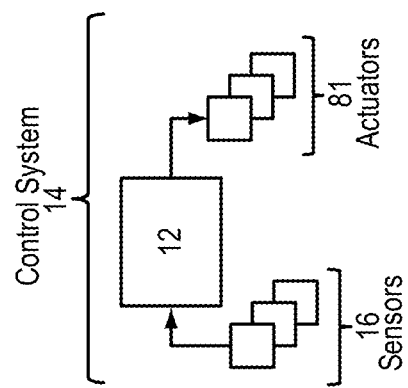
Figure 2A:
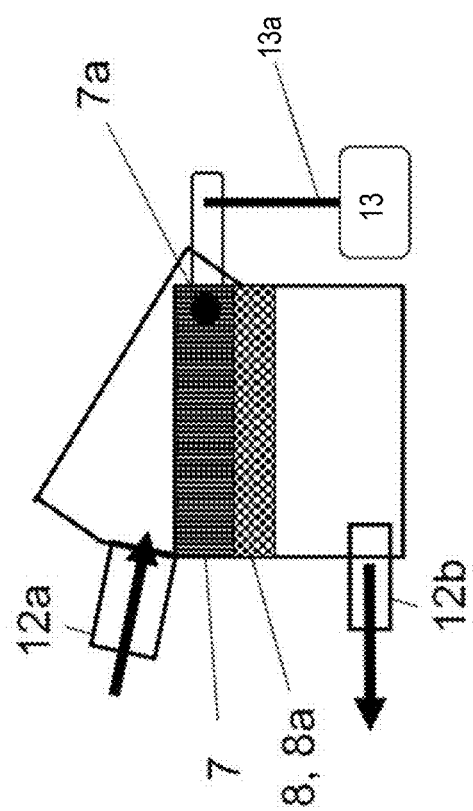
FIG. 2a shows a first position of a heat exchanger.
Figure 2B:
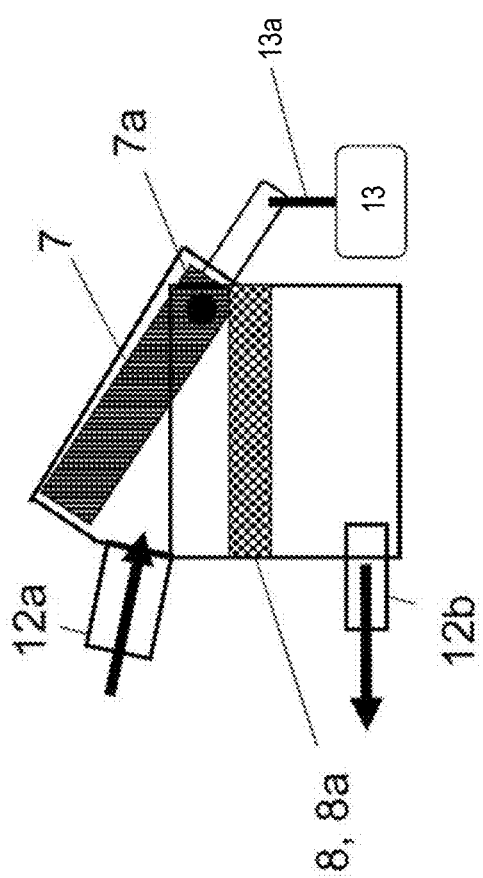
FIG. 2b shows a second position of the heat exchanger.
Figure 3:
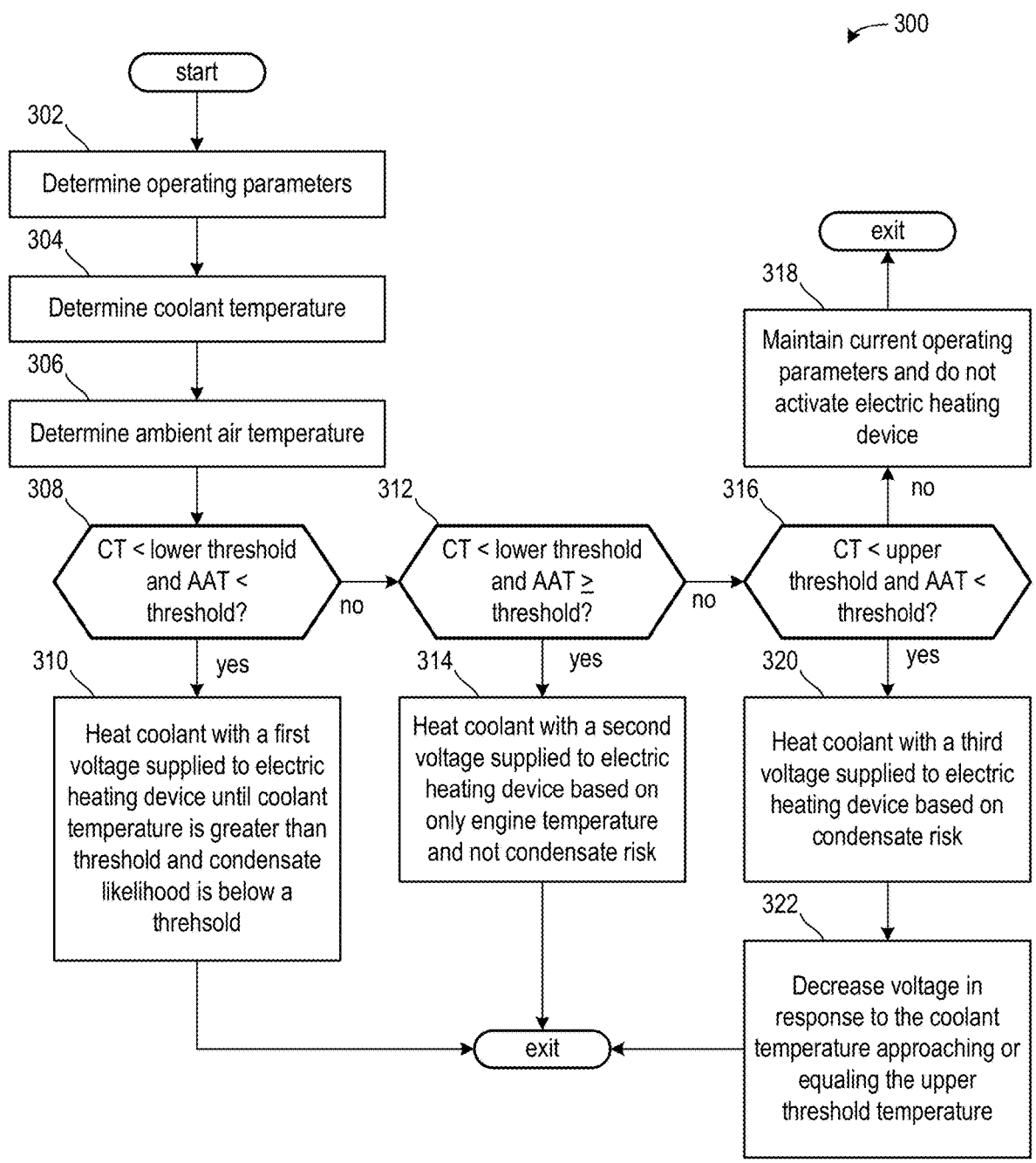
FIG. 3 shows a method for operating the electric heating device.

The following description relates to systems and methods for a turbocharged internal combustion engine comprising a charge air cooler and an exhaust gas recirculation configuration. An embodiment of the internal combustion engine comprising a heat exchanger arranged in a common housing with an air filter is shown in FIG. 1. Therein, the heat exchanger and the air filter are arranged in a most upstream portion of an intake passage relative to a direction of air flow. The heat exchanger may comprise a first position and a second position, wherein the first position is operational and air flowing therethrough is in thermal communication with coolant, the second position is inoperative and air flowing therethrough is thermally isolated from the coolant. The first and second position are shown in FIGS. 2a and 2b, respectively. A heating device is configured to heat coolant leaving the engine, wherein heated coolant from the heating device is directed to the heat exchanger prior to returning to the engine. A method for operating the electric heating device is shown in FIG. 3. Therein, the method may adjust a voltage supplied to the heating device in response to an ambient air temperature and a coolant temperature. In one example, the voltage supplied to the heating device is increased in response to each of the ambient air temperature and the coolant temperature being less than respective thresholds. The voltage supplied may then decrease in response in one of the ambient air temperature and coolant temperature exceeding their respective thresholds.

The exhaust-gas recirculation arrangement may, in the present case, be a high-pressure EGR arrangement, which extracts exhaust gas from the exhaust-gas discharge system upstream of the turbine of an exhaust-gas turbocharger and introduces said exhaust gas into the intake system, or a low-pressure EGR arrangement, via which exhaust gas which has already flowed through the turbine is recirculated to the inlet side. A low-pressure EGR arrangement comprises a recirculation line which branches off from the exhaust-gas discharge system downstream of the turbine and which opens into the intake system upstream of the compressor.

The main advantage of the low-pressure EGR arrangement in relation to the high-pressure EGR arrangement is that the exhaust-gas flow introduced into the turbine during exhaust-gas recirculation is not reduced by the recirculated exhaust-gas flow rate. The entire exhaust-gas flow is available at the turbine for generating an adequately high boost pressure.

The exhaust gas which is recirculated via the low-pressure EGR arrangement to the inlet side, and in an individual case cooled, is mixed with fresh air upstream of the compressor. The mixture of fresh air and recirculated exhaust gas produced in this way forms the charge air which is supplied to the compressor and compressed.

Here, the fact that exhaust gas is conducted through the compressors during the course of the low-pressure EGR is not detrimental, because exhaust gas is preferably used which has been subjected to exhaust-gas aftertreatment, in particular in a particle filter, downstream of the turbine. There is therefore no risk of deposits in the compressor which change the geometry of the compressor, in particular the flow cross sections, and thereby impair the efficiency of the compressor.

Condensate formation can be avoided or reduced according to the disclosure. In this respect, a limitation of the exhaust-gas flow rate recirculated via low-pressure EGR is not realized, such that high recirculation rates via low-pressure EGR can be realized in order to obtain a considerable reduction in nitrogen oxide emissions.

Nevertheless, in addition to the low-pressure EGR arrangement, a high-pressure EGR arrangement may also be used, in the case of which exhaust gas is extracted from the exhaust-gas discharge system upstream of the turbine of an exhaust-gas turbocharger and is introduced into the intake system downstream or upstream of the compressor.

Embodiments of the supercharged internal combustion engine may comprise where a consumer is not arranged in the coolant circuit between the heat exchanger and the electrically operated heating device. A consumer comprises a unit which demands an admission of heat for maintaining its function, for example heating of the vehicle interior or oil heating. In this respect, a shut-off element, for example a flap or a valve, is not a consumer.

A consumer may extract heat from the coolant before entry into the heat exchanger and would reduce the transfer of heat from the coolant to the charge air in this way, thereby decreasing a heating of the charge air, which may result in increased condensate formation.

Embodiments of the supercharged internal combustion engine may comprise where an air-cleaning device is arranged in the intake system upstream of the first junction point. An air-cleaning device filters particles and foreign bodies out of the charge-air flow, as a result of which not only impurities, but also degradation in the downstream intake system, the at least one compressor, and the internal combustion engine can be mitigated.

In this context, embodiments of the supercharged internal combustion engine may comprise where the air-cleaning device and the heat exchanger are configured as a joint integrative component. Both the air-cleaning device and the heat exchanger profit from as large a surface as possible. In the case of the air-cleaning device, a large filter surface ensures a sufficiently large charge-air flow with little loss of pressure. In the case of the heat exchanger, the quantity of heat which can be transmitted is increased, the larger the heat-transmitting surface.

An integrative component comprising the air-cleaning device and the heat exchanger can be configured as a preassembled assembly and contributes to more effective packaging in the engine compartment.

Embodiments of the supercharged internal combustion engine may comprise where the at least one compressor has an inlet region which runs coaxially with respect to the shaft of the compressor and is designed such that the flow of charge air approaching the compressor runs substantially axially.

In the case of an axial inflow to the compressor, a diversion or change in direction of the charge-air flow in the intake system upstream of the at least one compressor impeller is often omitted, whereby unnecessary pressure losses in the charge-air flow owing to flow diversion are avoided, and the pressure of the charge air at the inlet into the compressor of the exhaust-gas turbocharger is increased. The absence of a change in direction also reduces the contact of the exhaust gas and/or charge air with the internal wall of the intake system and/or with the internal wall of the compressor housing, and thus reduces the heat transfer and the formation of condensate.

Embodiments of the supercharged internal combustion engine may comprise where the at least one compressor arranged in the intake system belongs to an exhaust-gas turbocharger, which comprises a turbine arranged in the exhaust-gas discharge system and a compressor arranged in the intake system.

A turbine having a variable turbine geometry permits a more detailed adaptation to the respective operating point of the internal combustion engine by way of adjustment of the turbine geometry or the effective turbine cross section, it being possible for engine speed-dependent or load-dependent regulation of the turbine geometry to take place to a certain extent.

It is possible, using a plurality of turbochargers, to improve the torque characteristic of a supercharged internal combustion engine. It is basically also possible for a mechanical or electric supercharger to be provided in addition to an exhaust-gas turbocharger.

Embodiments of the supercharged internal combustion engine may comprise where the recirculation line branches off from the exhaust-gas discharge system, so as to form a second junction point, downstream of the turbine of the exhaust-gas turbocharger.

In this context, embodiments of the supercharged internal combustion engine may comprise where a first shut-off element is arranged in the exhaust-gas discharge system downstream of the second junction point.

Here, the recirculation line branches off from the exhaust-gas discharge system between the turbine and the first shut-off element. The first shut-off element can be used for increasing the exhaust-gas pressure upstream in the exhaust-gas discharge system, and is thus conducive to, and can be utilized for, increasing the pressure gradient between the exhaust-gas discharge system and the intake system. This offers advantages in particular in the case of high recirculation rates, which demand a greater pressure gradient.

Embodiments of the supercharged internal combustion engine may comprise where a second shut-off element is arranged in the intake system upstream of the first junction point.

The second shut-off element serves, at the inlet side, for reducing the pressure in the intake system, and is thus, like the first shut-off element, conducive to increasing the pressure gradient between the exhaust-gas discharge system and the intake system.

Embodiments of the supercharged internal combustion engine may comprise where the first and/or second shut-off element is a pivotable flap.

Embodiments of the supercharged internal combustion engine may comprise where an EGR cooler is arranged in the recirculation line. The cooling of the recirculated exhaust gas is desired in particular at high exhaust-gas flow rates to be recirculated or high recirculation rates.

Embodiments of the supercharged internal combustion engine may comprise where an EGR valve is arranged in the recirculation line.

An EGR valve serves for setting the recirculated exhaust-gas flow rate. In particular, embodiments may comprise where the EGR valve is arranged at the first junction point. Embodiments may further comprise where the EGR valve is a combined valve with which both the flow rate of recirculated exhaust gas and the fresh-air flow rate can be adjusted. That is to say, the EGR valve may further function as a throttle for controlling the flow of intake air in addition to recirculated exhaust gas.

Additionally or alternatively, a method for operating a supercharged internal combustion engine similar to the configuration previously described may comprise that the electrically operated heating device is activated, in order to increase the temperature of the coolant before it enters the heat exchanger and, using the heated coolant, to introduce heat into the charge air and to increase the charge-air temperature in this way.

The method may further include where the electrically operated heating device is activated, if condensate formation in the intake system is anticipated are advantageous.

The method may further include where the electrically operated heating device is activated following cold starting of the internal combustion engine.

Method variants are advantageous in which the electrically operated heating device is activated, if the ambient temperature lies below a predetermined limit temperature.

An internal combustion engine of the stated type is used as a motor vehicle drive. Within the context of the present invention, the expression "internal combustion engine" encompasses diesel engines and Otto-cycle engines, but also hybrid internal combustion engines, that is to say internal combustion engines which are operated with a hybrid combustion process, and hybrid drives which, in addition to the internal combustion engine, comprise at least one further torque source for driving a motor vehicle, for example an electric machine which is connectable in terms of drive or connected in terms of drive to the internal combustion engine and which outputs power instead of the internal combustion engine or in addition to the internal combustion engine.

FIG. 1 schematically shows a first embodiment of the supercharged internal combustion engine 1, which is equipped with an exhaust-gas turbocharger 5 which comprises a turbine 5b arranged in the exhaust-gas discharge system 3 and having variable turbine geometry, and a compressor 5a arranged in the intake system 2. The hot exhaust gas expands in the turbine 5b with a release of energy. The compressor 5a compresses the charge air which is supplied to the cylinders via the intake system 2 and the charge-air cooler 2a provided downstream, as a result of which supercharging of the internal combustion engine 1 is achieved. The internal combustion engine is a four-cylinder in-line engine in which the four cylinders are arranged along the longitudinal axis of the cylinder head, that is to say in a line.

The internal combustion engine 1 has a liquid cooling arrangement 10 which comprises a coolant circuit 10a which conducts a coolant.

The internal combustion engine 1 is equipped with an exhaust-gas recirculation arrangement 6, here a low-pressure EGR arrangement 6, which comprises a recirculation line 6a which, downstream of the turbine 5b, branches off from the exhaust-gas discharge system 3 so as to form a second junction point 6" and, upstream of the compressor 5a, leads into the intake system 2 so as to form a first junction point 6'. An EGR valve 6b and an EGR cooler 6c are arranged in the recirculation line 6a of the low-pressure EGR arrangement 6.

The exhaust gas which flows through the turbine 5b is subjected between the turbine 5b and the second junction point 6" to an exhaust-gas aftertreatment in a particle filter 9, and therefore only exhaust gas purified of soot particles flows through the compressor 5a.

A second shut-off element 2b is arranged in the intake system 2 upstream of the first junction point 6' and can be used to reduce the pressure downstream in the intake system 2, as a result of which the pressure gradient between the exhaust-gas discharge system 3 and the intake system 2 is increased. This offers advantages in particular in the case of high recirculation rates, which demand a greater pressure gradient.

An assembly is provided upstream of the first junction point 6' and the second shut-off element 2b. The assembly comprises an air-cleaning device 8 in the form of a filter and a heat exchanger 7, wherein, according to FIG. 1, the heat exchanger 7 is arranged upstream of the air-cleaning device 8.

The heat exchanger 7 is incorporated into the coolant circuit 10a of the liquid cooling arrangement 10 and serves for transferring heat between the charge air and the coolant. The temperature of the charge air flowing through the heat exchanger 7 via intake system 2 can thereby be increased, that is to say raised, using the coolant.

For this purpose, the liquid cooling arrangement 10 of the internal combustion engine 1 is equipped with an electrically operated heating device 11 which is arranged in the coolant circuit 10a upstream of the heat exchanger 7 and with which the temperature of the coolant can be increased before it enters the heat exchanger 7. Via the heating device 11, the coolant temperature can be raised beyond the temperature of the charge air, and therefore, using the heated coolant, heat can be introduced into the charge air as it flows through the heat exchanger 7.

Formation of condensate in the intake system 2 may be mitigated via activation of the heating device 11. In one example, the heating device 11 is powered via a battery 90. In some examples, battery 90 may be further configured to power an electric motor, wherein the electric motor may be configured to drive a vehicle. In this way, the internal combustion engine 1 may be an engine of a hybrid vehicle.

Vehicle system 6 may further include control system 14. Control system 14 is shown receiving information from a plurality of sensors 16 (various examples of which are described herein) and sending control signals to a plurality of actuators 81 (various examples of which are described herein). Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

FIG. 2a schematically shows the heat exchanger 7 of the first embodiment illustrated in FIG. 1 together with the air-cleaning device 8 and a heat exchanger 7 situated in the working position (e.g., a first position that is an operational position).

The air-cleaning device 8 here is a filter 8a and is arranged in the intake system 2 downstream of the heat exchanger 7.

The air-cleaning device 8 and the heat exchanger 7 are configured as an integrative component and have a joint housing, into which the charge air flows via inlet 12a and where the charge air leaves in filtered form via outlet 12b.

The heat exchanger 7 is mounted rotatably and can be transferable from a working position into an inoperative position, and vice versa, by pivoting about the rotatable mounting 7a.

FIG. 2a shows the heat exchanger 7 in the working position in which the charge air flows through the heat exchanger 7 and the heat exchanger 7 can be used to admit heat into the charge air. An actuator 13 having an actuator rod 13a is provided as an adjustment device 13 in order to transfer the heat exchanger 7 from one position into another position.

FIG. 2b shows the heat exchanger 7 in the inoperative position in which the charge air does not flow through the heat exchanger 7. The heat exchanger 7 is transferred from the working position into the inoperative position by pivoting upwards. The joint housing has a recess for receiving the heat exchanger 7 in the inoperative position.

FIGS. 1, 2a, and 2b show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 3, it shows a method 300 for operating the electric heating device based on a combination of one or more of a charge-air temperature and a coolant temperature. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, which includes determining, estimating, and/or measuring current operating parameters. Current operating parameters may include but are not limited to one or more of a throttle position, EGR flow rate, manifold vacuum, engine load, engine speed, and air/fuel ratio.

The method 300 proceeds to 304, which includes determining a coolant temperature. The coolant temperature may be determined via a coolant sensor, wherein the coolant sensor is arranged in a coolant jacket of a cylinder of an engine, in one example. Additionally or alternatively, the coolant temperature may be estimated based on a model tracking an engine speed, an ambient temperature, an engine run-time, and other conditions that affect the coolant temperature.

The method 300 proceeds to 306, which includes determining ambient air temperatures. Ambient air temperatures may be determined via a temperature sensor or may be provided via a weather data service. In one example, a navigation system may provide a location of the vehicle, wherein an internet device or other similar device may relay temperature data to the navigation system.

The method 300 proceeds to 308, which includes determining if the coolant temperature is less than a lower threshold temperature and if the ambient air temperature is less than a threshold ambient temperature. In one example, the lower threshold temperature may represent a lowest temperature of a desired temperature range at which it is desired to operate the engine. Said another way, the desired temperature range represents a temperature range at which the engine is not too hot or too cold. Thus, a coolant temperature below the lower threshold temperature may correspond to a cold-start of the engine. The threshold ambient temperature may correspond to an ambient temperature where condensate may form if the air is mixed with exhaust gas. As such, the threshold ambient temperature may be a dynamic threshold which may be adjusted based on an exhaust gas temperature, a temperature of intake wall surfaces, a compressor temperature, a charge-air cooler temperature, and the like. In one example, as the likelihood of condensate formation increases, the threshold ambient temperature may increase.

If the coolant temperature is less than the threshold coolant temperature and the ambient air temperature is less than the threshold ambient temperature, then the method 300 proceeds to 310, which includes heating the coolant with a first amount of voltage supplied to the electric heating device. The electric heating device may remain activated until the coolant temperature is greater than or equal to the threshold coolant temperature and the ambient air temperature is greater than or equal to the threshold ambient temperature.

In one example, as the coolant is heated, the charge air passes over passages in the heat exchanger, which receives the heated coolant. As such, the charge air contacts the heated coolant before the heated coolant flows to the engine and heats surfaces therein. Due to the desire to heat the ambient air and the engine, the first voltage may be a highest voltage supplied to the electric device. Furthermore, in examples, where the heat exchanger is moveable, the heat exchanger may be pivoted to the first position illustrated in FIG. 2a such that charge-air may pass through the heat exchanger. In one example, the heating during the condition where the cold start is occurring in combination with the cold ambient air may result in the electric heating device being activated to both heat the charge-air to limit condensate formation along with heating the engine to reduce a cold-start duration. As such, a duration of the time in which the electric heating device is activated may be based on the charge-air temperature and the cold-start.

It will be appreciated that a likelihood of condensate formation may be relatively low if exhaust gas is not flowing. During a condition where exhaust gas is not being recirculated, the method 300 may ignore an ambient air temperature and operate the electric heating device only based on the coolant temperature.

Returning to 308, if both of the coolant temperature and the ambient air temperature are not less than their respective thresholds, then the method 300 proceeds to 312 to determine if the coolant temperature is less than the lower threshold temperature and if the ambient air temperature is greater than or equal to the threshold ambient temperature. If the coolant temperature is less than the lower threshold temperature and the ambient air temperature is greater than or equal to the threshold ambient temperature, then the method 300 proceeds to 314.

At 314, the method 300 includes heating the coolant with a second voltage supplied to the electric heating device based on only the engine temperature and not a condensate risk. In one example, the method 300 at 314 may also correspond to a condition where exhaust gas is not being a recirculated, resulting in a reduced risk of condensate formation. In one example, the second voltage may be less than the first voltage due to the coolant being used to primarily heat the engine due to the elevated ambient air temperatures. Additionally or alternatively, the second voltage may be equal to the first voltage. However, the electric heating device may be activated for a shorter duration of time as the coolant may more rapidly heat the engine as less heat is used to heat the charge-air.

In some embodiments, such as embodiments where the heat exchanger is moveable, the second voltage may be reduced by actuating the heat exchanger such that thermal gains provided by the heat exchanger are not lost to charge air. The heat exchanger may be pivoted to the second position, which is a non-operational position. In the second position, charge air may not pass over the heat exchanger such that thermal gains provided by the electric heating device may not be lost to heating the charge air. In this way, a battery charge consumption may be reduced, resulting in increased efficiency.

Returning to 312, if the coolant temperature is not less than the lower threshold temperature and the ambient air temperature is not greater than or equal to the threshold ambient temperature, then the method 300 proceeds to 316, which includes determining if the coolant temperature is less than an upper threshold temperature and if the ambient air temperature is less than the threshold ambient temperature.

If the answer is no at 316, then the method 300 proceeds to 318 to maintain current engine operating parameters and does not activate the electric heating device. As such, a state-of-charge (SOC) of the battery is maintained.

If the answer at 316 is yes, then the method 300 proceeds to 320 to heat the coolant with a third voltage supplied to the electric heating device based on only a condensate risk and not based on an engine cold-start. As such, an engine hot start may be occurring where ambient temperatures are below the threshold ambient temperature. Additionally, exhaust gas is being recirculated in the present example.

The third voltage may be different than each of the first voltage and the second voltage. In one example, the third voltage is less the each of the first voltage and the second voltage. Additionally or alternatively, the third voltage is less than the first voltage and greater than or equal to the second voltage. Additionally or alternatively, the third voltage is equal to each of the first voltage and the second voltage.

The method 300 proceeds to 322, which includes decreasing the voltage supplied to the electric heating device in response to the coolant temperature approaching or equaling the upper threshold temperature. That is to say, an amount of heating provided to the coolant by the electric heating device may be reduced to block the engine from overheating. In one example, the voltage may be set to an amount such that after heating the charge-air, the coolant temperature is reduced to a temperature between the lower and upper threshold temperatures.

In one example, a coolant pump configured to divert the engine coolant to a radiator may be deactivated. Additionally or alternatively, an output of the coolant pump may be reduced such that As such, the heat exchanger may supplement cooling provided to the engine coolant in combination with the radiator. In one example, the electric heating device may be deactivated during a hot engine start with cold ambient temperatures to increase efficiency.

In another representation, a hybrid vehicle, comprises a supercharged internal combustion engine and an electric motor powered via a battery, wherein the engine further comprises a liquid cooling arrangement comprising a coolant circuit conducting a coolant, an intake system for the supply of charge air, an exhaust-gas discharge system for the discharge of exhaust gas, at least one compressor which is arranged for the purposes of compressing the charge air in the intake system and comprises at least one impeller which is mounted on a rotatable shaft in a compressor housing and is equipped with impeller blades, an exhaust-gas recirculation arrangement comprising a recirculation line which opens into the intake system, so as to form a first junction point, upstream of the at least one compressor impeller, and a heat exchanger which is arranged upstream of the first junction point in the intake system and is incorporated into the coolant circuit and serves for transferring heat between the charge air and the coolant. The heat exchanger is movable such that the heat exchanger can be positioned differently in the intake system, wherein the charge air flows through the heat exchanger in a working position and does not flow through same in an inoperative position.

The recirculation line branches off from the exhaust-gas discharge system so as to form a second junction point. The heat exchanger is mounted rotatably and is pivotable such that the heat exchanger can be transferred from the working position into the inoperative position, and vice versa, by pivoting. The heat exchanger is displaceable in a translational manner such that the heat exchanger can be transferred from the working position into the inoperative position, and vice versa, by displacement. An air-cleaning device is arranged in the intake system upstream of the first junction point. The air-cleaning device and the heat exchanger are configured as a joint integrative component.

The hybrid vehicle further comprises a controller with computer-readable instructions stored on non-transitory memory thereof that when executed enable the controller to activate the heating device in response to one or more of a coolant temperature being less than a threshold coolant temperature and a charge-air temperature being less than a threshold ambient temperature. In one example, the threshold ambient temperature is based on a condensate risk, wherein as the condensate risk increases, the threshold ambient temperature increases. That is to say, further heating of the charge-air may be desired if the condensate risk is relatively high.

The heating device is configured to heat coolant flowing to the heat exchanger, wherein the heated coolant may be used to heat the charge-air and the engine in a first, working position of the heat exchanger. Additionally or alternatively, if heating of the charge air is undesired, such as when ambient temperatures are above the threshold ambient temperature or when exhaust gas is not being recirculated, then the heat exchanger may be moved (e.g, linearly or rotationally) so that charge air flowing into a common housing does not pass over the heat exchanger while still passing over the air filter. By doing this, electrical energy consumption may be limited during conditions where a cold-start is occurring but a condensate risk is less than a threshold risk.

In this way, a heat exchanger, comprising an air filter arranged therein, is coupled to an electric heating device configured to heat coolant leaving an engine coolant circuit. The heat exchanger allows charge-air to thermally communicate with the coolant prior to returning the coolant to the engine. The technical effect of the electric heating device is to decrease a condensate risk and a cold-start duration via heating the coolant. By doing this, emissions may be reduced while a packaging size of the heat exchanger may be reduced by combining it with the air filter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine, comprising:
   a liquid cooling arrangement comprising a coolant circuit conducting a coolant,
   an intake system configured to supply charge air;
   an exhaust-gas discharge system configured to discharge exhaust gas;
   at least one compressor arranged in the intake system, wherein the at least one compressor comprises at least one impeller which is mounted on a rotatable shaft in a compressor housing and is equipped with impeller blades;
   an exhaust-gas recirculation arrangement comprising a recirculation line which opens into the intake system at a junction point, upstream of the at least one compressor impeller; and
   a heat exchanger arranged upstream of the junction point in the intake system, wherein the heat exchanger is fluidly coupled to the coolant circuit and configured to allow thermal communication between the charge air and the coolant, further comprising an electrically operated heating device arranged in the coolant circuit upstream of the heat exchanger.

2. The supercharged internal combustion engine of claim 1, wherein the junction point is a first junction point, wherein the recirculation line branches off from the exhaust-gas discharge system at a second junction point.

3. The supercharged internal combustion engine of claim 1, wherein a consumer is not arranged in the coolant circuit between the heat exchanger and the electrically operated heating device.

4. The supercharged internal combustion engine of claim 1, wherein an air-cleaning device and the heat exchanger are configured as a joint integrative component arranged in a common housing.

5. The supercharged internal combustion engine of claim 4, wherein the heat exchanger is moveably arranged in the common housing between a first position and a second position, wherein the first position is a working position configured to allow charge air to pass through the heat exchanger, and where the second position is a non-working position configured to block charge air from passing through the heat exchanger, wherein the charge air flows through only the air filter of the common housing when the heat exchanger is moved to the second position.

6. The supercharged internal combustion engine of claim 1, wherein the at least one compressor comprises an inlet region which runs coaxially with respect to the rotatable shaft of the compressor, where charge air approaches the compressor axially.

7. The supercharged internal combustion engine of claim 1, wherein the at least one compressor arranged in the intake system is part of an exhaust-gas turbocharger, wherein the exhaust-gas turbocharger comprises a turbine arranged in the exhaust-gas discharge system and a compressor arranged in the intake system.

8. The supercharged internal combustion engine of claim 7, wherein the junction point is a first junction point, where the recirculation line branches off from the exhaust-gas discharge system downstream of the turbine of the exhaust-gas turbocharger at a second junction point.

9. The supercharged internal combustion engine of claim 8, wherein a shut-off element is arranged in the exhaust-gas discharge system downstream of the second junction point.

10. The supercharged internal combustion engine of claim 9, wherein the shut-off element is a first shut-off element, and wherein a second shut-off element is arranged in the intake system upstream of the first junction point.

11. The supercharged internal combustion engine of claim 10, wherein an EGR cooler is arranged in the recirculation line.

12. The supercharged internal combustion engine of claim 1, further comprising a controller with computer-readable instructions stored on non-transitory memory thereof that when executed enable the controller to activate the electrically operated heating device in response to one or more of an ambient air temperature and a coolant temperature.

13. A system, comprising:
   a heat exchanger and an air filter arranged within a common housing in an intake passage, wherein the heat exchanger is fluidly coupled to a heating device configured to receive coolant returning to an engine; and
   a controller with computer-readable instructions stored on non-transitory memory thereof that when executed enable the controller to:
   activate the heating device in response to at least one of an ambient air temperature being less than a threshold ambient temperature and a coolant temperature being less than a threshold coolant temperature.

14. The system of claim 13, wherein the heating device is electrically powered via a battery of a vehicle.

15. The system of claim 13, wherein the heating device heats coolant returning to the engine, wherein coolant leaving the heating device flows through the heat exchanger prior to returning to the engine.

16. The system of claim 13, wherein the heating device is configured to receive a plurality of voltages configured to provide different amounts of heating.

17. The system of claim 16, wherein the instructions further enable the controller to increase a voltage provided to the heating device in response to each of the ambient air temperature being less than the threshold ambient temperature and the coolant temperature being less than the threshold coolant temperature.

18. The system of claim 17, wherein the instructions further enable the controller to decrease the voltage provided to the heating device in response to only one of the ambient air temperature being less than the threshold ambient temperature or the coolant temperature being less than the threshold coolant temperature.

19. An engine system, comprising:
a heat exchanger and an air filter arranged in a single housing, wherein the single housing in arranged in a most upstream portion of an intake passage; and
an electric heating device configured to heat coolant leaving an engine, wherein the electric heating device directs coolant to the heat exchanger before returning the coolant to the engine.

20. The engine system of claim 19, wherein there are no devices arranged between the electric heating device and the heat exchanger.

\* \* \* \* \*